(12) United States Patent
Miyazaki et al.

(10) Patent No.: US 9,158,300 B2
(45) Date of Patent: Oct. 13, 2015

(54) METHOD FOR DESIGNING A CONTROL APPARATUS AND CONTROL APPARATUS

(75) Inventors: Seiya Miyazaki, Hyogo (JP); Takahiro Kudoh, Kyoto (JP); Yutaka Yamamoto, Kyoto (JP); Masaaki Nagahara, Kyoto (JP)

(73) Assignee: PANASONIC CORPORATION, Osaka (JP)

( * ) Notice: Subject to any disclaimer, the term of this patent is extended or adjusted under 35 U.S.C. 154(b) by 327 days.

(21) Appl. No.: 13/817,971

(22) PCT Filed: May 28, 2012

(86) PCT No.: PCT/JP2012/003470
§ 371 (c)(1),
(2), (4) Date: Feb. 20, 2013

(87) PCT Pub. No.: WO2013/001713
PCT Pub. Date: Jan. 3, 2013

(65) Prior Publication Data
US 2013/0150993 A1    Jun. 13, 2013

(30) Foreign Application Priority Data

Jun. 30, 2011    (JP) ................................ 2011-146801

(51) Int. Cl.
*G05B 19/418* (2006.01)
*H01M 10/44* (2006.01)
(Continued)

(52) U.S. Cl.
CPC ......... *G05B 19/41865* (2013.01); *H01M 10/44* (2013.01); *H01M 10/48* (2013.01); *H02J 7/044* (2013.01); *H02J 7/045* (2013.01)

(58) Field of Classification Search
USPC ................ 700/98, 286, 295; 307/48, 64, 391; 320/136, 128
See application file for complete search history.

(56) References Cited

U.S. PATENT DOCUMENTS 5,521,896 A * 5/1996 Bajorek et al. ............. 369/53.18
7,233,591 B2 * 6/2007 Holtzman et al. ............ 370/391
(Continued)

FOREIGN PATENT DOCUMENTS

CN    1787589 A    6/2006
CN    101421899 A    4/2009
(Continued)

OTHER PUBLICATIONS

International Search Report issued Aug. 7, 2012 in International (PCT) Application No. PCT/JP2012/003470.
(Continued)

*Primary Examiner* — Kidest Bahta
(74) *Attorney, Agent, or Firm* — Wenderoth, Lind & Ponack, L.L.P.

(57) ABSTRACT

A method for designing a control apparatus includes: determining first, second and third threshold values; setting a first weighting function for calculating a first controlled variable by being multiplied by a difference between a control target value and an output value of a storage battery, a second weighting function for calculating a second controlled variable by being multiplied by the output value of the storage battery, and a third weighting function for calculating a third controlled variable by being multiplied by an integrated value of the output value of the storage battery; and determining a transfer function of the control apparatus in accordance with an H-infinity control theory such that the first controlled variable, the second controlled variable and the third controlled variable are respectively smaller than the first, second and third threshold values.

6 Claims, 13 Drawing Sheets

(51) Int. Cl.
*H01M 10/48* (2006.01)
*H02J 7/04* (2006.01)

(56) References Cited

U.S. PATENT DOCUMENTS

| | | | |
|---|---|---|---|
| 8,050,722 | B2 | 11/2011 | Kimata |
| 8,127,874 | B2 | 3/2012 | Suzui |
| 2002/0060545 | A1 | 5/2002 | Inagaki et al. |
| 2004/0084956 | A1* | 5/2004 | Mayenburg et al. .............. 303/2 |
| 2005/0077877 | A1* | 4/2005 | Cawthorne ................... 320/128 |
| 2006/0128445 | A1 | 6/2006 | Kimata |
| 2008/0007221 | A1* | 1/2008 | Lee .............................. 320/128 |
| 2008/0252259 | A1* | 10/2008 | Suzuki et al. ................. 320/136 |
| 2009/0321163 | A1 | 12/2009 | Suzui |
| 2010/0187907 | A1 | 7/2010 | Toba et al. |

FOREIGN PATENT DOCUMENTS

| | | |
|---|---|---|
| EP | 1 255 175 | 11/2002 |
| JP | 2001-112176 | 4/2001 |
| JP | 2010-41802 | 2/2010 |
| JP | 2010-71159 | 4/2010 |

OTHER PUBLICATIONS

John C. Doyle et al., "State-Space Solutions to Standard $H_2$ and $H_\infty$ Control Problems", IEEE Transactions on Automatic Control, vol. 34, No. 8, p. 831-847, Aug. 1989.

Kazuyuki Okamoto et al., "Application of battery charger control system which uses H∞ control", Denki setsubi gakkai zenkoku taikai kouen ronbun shuu (Collection of papers from the lectures in the National convention of the Institute of Electrical Installation Engineers of Japan), vol. 20, Aug. 1, 2002, p. 139-140, with partial English Translation.

Office Action issued May 4, 2015 in corresponding Chinese Patent Application No. 201280001981.0 (with English translation of Search Report).

Xing Zhang et al., "Research on intelligentized charging equipment", Journal University of Shanghai for Science and Technology, vol. 26, No. 4, Dec. 31, 2004 (with English abstract).

Jian Deng et al., "Software Design of FCEV Battery Management System and Prediction of SOC", Instrumentation Technology, vol. 12, Dec. 31, 2010 (with English abstract).

Extended European Search Report issued Jun. 5, 2015 in corresponding European Patent Application No. 12804147.2.

* cited by examiner

| Filter |
| --- |
| $F(s) = T_f s / (T_f s + 1)$, $T_f = 5.05/2\pi$ |
| Plant |
| $P(s) = 1 / (T_b s + 1)$, $T_b = 0.1/2\pi$ |
| Weighting function |
| $W1(s) = 1 / (0.1s + 1)$<br>$W2(s) = 0.0001s / (0.1s + 1)$<br>$W3(s) = 0.001$<br>$W4(s) = 0.02s / (0.1s + 1)$ |

FIG. 9

$x[n+1] = A_k x[n] + B_k e[n]$
$u[n] = C_k x[n]$ $$A_k = \begin{bmatrix} 0.9936 & 0.1098 & -0.0126 & -0.0100 & 3.8137 \\ -0.1105 & 0.7586 & -0.0557 & -0.0064 & 2.3678 \\ 0.0289 & 0.0552 & 1.0034 & 0.0108 & 1.4118 \\ -0.0032 & -0.0004 & 0.0131 & 0.8493 & -0.0046 \\ 0.0000 & 0.0000 & 0.0000 & -0.0002 & 0.0001 \end{bmatrix}$$

$$B_k = \begin{bmatrix} 1.5962 & -0.0039 \\ 1.2945 & -0.0030 \\ 0.5666 & 0.0004 \\ -0.0015 & -0.0192 \\ 0.0000 & 0.0000 \end{bmatrix}$$

$C_k = \begin{bmatrix} -44.1476 & -47.2399 & -16.1983 & 878.0462 & 3090708.5211 \end{bmatrix}$ $e[n] = \begin{bmatrix} e_1 \\ e_2 \end{bmatrix}$

METHOD FOR DESIGNING A CONTROL APPARATUS AND CONTROL APPARATUS

TECHNICAL FIELD

The present invention relates to a method for designing a control apparatus, and the like, and more particularly to a method for designing a control apparatus that outputs a command value to an inverter that controls power to be charged or discharged by a storage battery, and the like.

BACKGROUND ART

There is a limit to the amount of power by which storage batteries can be charged or discharged. Accordingly, power storage apparatuses having a control apparatus for controlling the operation of a storage battery by providing feedback of a deviation between the planned power storage amount value and the actual power storage amount value have been proposed (for example, Patent Literatures (PTLs) 1 and 2).

CITATION LIST

Patent Literature

[PTL 1] Japanese Unexamined Patent Application Publication No. 2001-112176
[PTL 2] Japanese Unexamined Patent Application Publication No. 2010-41802

Non Patent Literature

[NPL 1] "State-space solutions to standard $H_2$ and H-infinity control problems" by John C. Doyle, Keith Glover, Pramod P. Khargonekar, and Bruce A. Francis, IEEE Transactions on Automatic Control, 1989, 34 (8), pp. 831-847

SUMMARY OF INVENTION

Technical Problem

However, conventional control apparatuses are problematic in that it is difficult to appropriately balance all of the three properties of remaining-capacity variation suppression capability, target value followability, and robustness. As used herein, the "remaining-capacity variation suppression capability" refers to the property that controls variations in the capacity of the storage battery. The "target value followability" refers to the property that controls the charge and discharge of the storage battery such that the deviation between the planned value and the actual value for the storage amount is reduced as much as possible in a shorter period of time. The "robustness" refers to the property of not losing control stability in spite of a modeling error.

In view of the above, the present invention has been made to solve the problem encountered with the conventional techniques, and it is an object of the present invention to provide a method for designing a control apparatus, with which it is possible to design a control apparatus that controls a storage battery so as to appropriate balance all of the three properties of remaining-capacity variation suppression capability, target value followability, and robustness.

Solution to Problem

A method for designing a control apparatus according to one aspect of the present invention is a method for designing a control apparatus that outputs an output command value for instructing charging or discharging to an inverter that controls an output value indicating power to be charged or discharged by a storage battery in order for a storage amount of the storage battery to match a control target value, the method including: determining a first threshold value used in judging a first controlled variable, a second threshold value used in judging a second controlled variable, and a third threshold value used in judging a third controlled variable; setting a first weighting function for calculating the first controlled variable, a second weighting function for calculating the second controlled variable, and a third weighting function for calculating the third controlled variable; and determining a transfer function of the control apparatus that receives input of a difference between the control target value and the output value and an integrated value of the output value and outputs the output command value, wherein in the determining of a transfer function, the transfer function is determined in accordance with an H-infinity control theory such that the first controlled variable obtained by multiplying the difference between the control target value and the output value by the first weighting function is smaller than the first threshold value, the second controlled variable obtained by multiplying the output value by the second weighting function is smaller than the second threshold value, and the third controlled variable obtained by multiplying the integrated value of the output value by the third weighting function is smaller than the third threshold value.

Note that the present invention can be implemented not only as such a method for designing a control apparatus, but also as a control apparatus designed by the method for designing a control apparatus. Also, the method for designing a control apparatus can be implemented as a program that causes a computer to execute the method. Needless to say, the program can be distributed via recording media such as CD-ROM (Compact Disc Read Only Memory), and transmission media such as the Internet.

Furthermore, the present invention can be implemented as a semiconductor integrated circuit (LSI) that performs all or some of the functions of a control apparatus designed by the method for designing a control apparatus, or as a power control apparatus including such a control apparatus.

Advantageous Effects of Invention

According to the present invention, it is possible to design a control apparatus that controls a storage battery so as to appropriately balance all of the three properties of remaining-capacity variation suppression capability, target value followability, and robustness. Here, the H-infinity control theory is a control theory for constructing a control system that suppresses the influence of a disturbance signal or modeling error.

BRIEF DESCRIPTION OF DRAWINGS

FIG. 9 shows an example of a state space equation of the control apparatus according to an embodiment of the present invention.

DESCRIPTION OF EMBODIMENTS (Underlying Knowledge Forming Basis of the Present Invention)

The present inventors found that the following problems occur in the control apparatuses mentioned in the Background Art.

Storage batteries used in energy management systems are used as a back-up power source in the event of an emergency such as a blackout. The storage batteries are also used as a power source that stores excess power generated by solar cells in the daytime and supplies the power in the nighttime.

In recent years, systems consisting of a combination of a storage battery and a power generation apparatus such as a gas engine or a fuel cell have been proposed. With such a system, to meet the demand for power required by a load that varies abruptly and cannot be covered by the power generation apparatus alone, a storage battery having a relatively high response speed supplementarily supplies power, whereby the balance between demand and supply of power in the entire system can be stabilized.

However, there is a limit to the amount of power by which storage batteries can be charged or discharged. Accordingly, power storage apparatuses having a control apparatus for controlling the operation of a storage battery by providing feedback of a deviation between the planned power storage amount value and the actual power storage amount value have been proposed (for example, PTLs 1 and 2).

Figure 14:
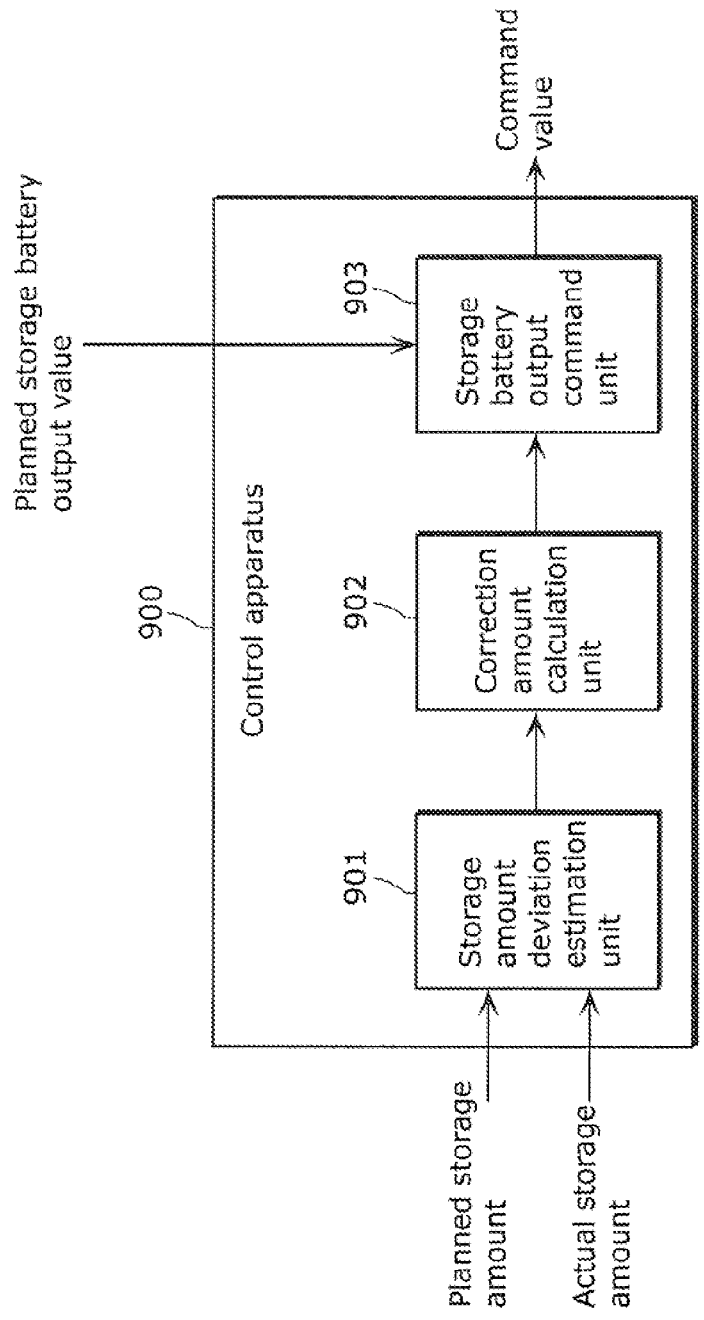
FIG. 14 is a block diagram showing a configuration of a conventional control apparatus of a storage battery.

FIG. 14 is a block diagram showing a configuration of a control apparatus provided in a power storage apparatus according to the related art of the present invention, described in PTL 2.

In FIG. 14, a control apparatus 900 includes a storage amount deviation estimation unit 901, a correction amount calculation unit 902, and a storage battery output command unit 903. The control apparatus 900 receives input of three parameters, namely, a planned storage battery output value, a planned storage amount, and an actual storage amount, and outputs a command value indicating the amount of power to be output by the storage battery. The control apparatus 900 calculates, with the storage amount deviation estimation unit 901, a deviation between the planned storage amount and the actual storage amount. Next, the correction amount calculation unit 902 calculates a correction amount by dividing the calculated deviation by a unit of time. Next, the storage battery output command unit 903 calculates a storage battery output value by adding the calculated correction amount to the planned storage battery output value.

As described above, the control apparatus 900 is configured by using a control method called "PI control" that controls the operation of the storage battery by providing feedback of the deviation between the planned value and the actual value for the storage amount. Here, PI control is a classical control technique that uses a proportional action and an integral action. Hereinafter, the property that controls the charge and discharge of a storage battery such that the deviation between the planned value and the actual value for the storage amount is reduced as much as possible in a shorter period of time will be referred to as the "target value followability".

However, the control apparatus of the related art that uses the PI control is problematic in that it is difficult to achieve both target value followability and long storage battery life.

It is known that significant variations in the capacity of a storage battery promote deterioration of the storage battery, and thus the property that suppresses variations in the capacity of the storage battery (hereinafter referred to as the "remaining-capacity variation suppression capability") is essential from the viewpoint of achieving a long storage battery life. In other words, there is a relationship that the life of the storage battery of the power storage apparatus increases as the remaining-capacity variation suppression capability of the control apparatus is increased.

Power demand-supply balance property is evaluated by using a 30-minute balancing value. The 30-minute balancing value is represented by the ratio between a contracted power amount and a difference between a target value and an actual value for the power at the power receiving point for every 30 minutes. This value is required to be constantly within, for example, ±3% by the agreement between each consumer and the power supplier. Accordingly, in order to bring the 30-minute balancing value closer to 0, it is important that the control apparatus further improves the target value followability with respect to the power target value at the power receiving point.

For this reason, in order to prevent the balancing value from degrading while suppressing variations in the capacity of the storage battery, it is necessary to simultaneously achieve two properties, namely, the remaining-capacity variation suppression capability and the target value followability in an appropriate balance.

However, these two properties are in a trade-off relationship. This is because, generally, in order to improve the target value followability, frequent repetition of charge and discharge of the storage battery is necessary. Therefore, in order to simultaneously achieve two characteristics, namely, the remaining-capacity variation suppression capability and the target value followability, by using the PI control, it is necessary to determine a plurality of control parameters of the PI control through a trial-and-error operation. Designing a control apparatus through such a trial-and-error operation requires a huge number of simulations when designing the control apparatus, and thus the designing is not easy.

In addition to the above problem, there is always some kind of error in the physical characteristics between an assumed model (referred to as a "nominal model") of a control system in simulations and the actual device due to linear approximation, aging deterioration or the like. Accordingly, the control apparatus is also required to have the property of not losing control stability in spite of such an error (referred to as a "modeling error"). Hereinafter, this property will be referred to as the "robustness".

Generally, when an attempt is made to improve the target value followability, the influence of an error between the model and the actual device on the result of control will also be large. As a result, the robustness decreases. Accordingly, with the PI control method, for the same reason as the above-described problem of balancing the remaining-capacity variation suppression capability and the target value followability, it is not easy to attain a design that simultaneously achieves two properties, namely, the robustness and the target value followability in an appropriate balance.

The present invention has been made to solve the problems encountered with the conventional techniques, and it is an object of the present invention to provide a method for designing a control apparatus, with which it is possible to design a control apparatus that controls a storage battery so as to appropriate balance all of the three properties of remaining-capacity variation suppression capability, target value followability, and robustness.

In order to solve such problems, a method for designing a control apparatus according to one aspect of the present invention is a method for designing a control apparatus that outputs an output command value for instructing charging or discharging to an inverter that controls an output value indicating power to be charged or discharged by a storage battery in order for a storage amount of the storage battery to match a control target value, the method including: determining a first threshold value used in judging a first controlled variable, a second threshold value used in judging a second controlled variable, and a third threshold value used in judging a third controlled variable; setting a first weighting function for calculating the first controlled variable, a second weighting function for calculating the second controlled variable, and a third weighting function for calculating the third controlled variable; and determining a transfer function of the control apparatus that receives input of a difference between the control target value and the output value and an integrated value of the output value and outputs the output command value, wherein in the determining of a transfer function, the transfer function is determined in accordance with an H-infinity control theory such that the first controlled variable obtained by multiplying the difference between the control target value and the output value by the first weighting function is smaller than the first threshold value, the second controlled variable obtained by multiplying the output value by the second weighting function is smaller than the second threshold value, and the third controlled variable obtained by multiplying the integrated value of the output value by the third weighting function is smaller than the third threshold value.

With this configuration, at the stage of designing a control apparatus, the target value followability can be adjusted by setting the first weighting function. Also, the robustness can be adjusted by setting the second weighting function. Also, the remaining-capacity variation suppression capability can be adjusted by setting the third weighting function. In other words, it is possible to, at the time of design, individually set the weighting functions that respectively correspond to three properties between which an appropriate balance needs to be achieved. Also, it is possible to easily check, by for example simulation, the balance between the remaining-capacity variation suppression capability, the target value followability and the robustness of the control apparatus based on the H-infinity control theory calculated by using the set weighting functions. It is therefore possible to design a control apparatus that controls a storage battery so as to appropriate balance all of the three properties of remaining-capacity variation suppression capability, target value followability, and robustness.

Also, it is possible that in the determining of a threshold value, a fourth threshold value is further determined, in the setting of weighting functions, a fourth weighting function for calculating a fourth controlled variable by being multiplied by the output command value is set, and in the determining of a transfer function, the transfer function is further determined in accordance with the H-infinity control theory such that the fourth controlled variable is smaller than the fourth threshold value.

With this configuration, by setting the fourth weighting function, the robustness can be adjusted with higher accuracy. It is therefore possible to more finely adjust the balance between the remaining-capacity variation suppression capability, the target value followability and the robustness.

A control apparatus according to one aspect of the present invention includes a matrix storage unit configured to store a coefficient matrix for representing, as a state space, the transfer function determined by the method for designing a control apparatus described above; a state storage unit configured to store a vector representing an internal state in the state space; and a computation unit configured to calculate the output command value based on the difference between the control target value and the output value of the storage battery, the integrated value of the output value of the storage battery, the internal state stored in the state storage unit, and the coefficient matrix.

With this configuration, the control apparatus can appropriately balance all of the three properties of remaining-capacity variation suppression capability, target value followability, and robustness by performing H-infinity control that takes into consideration the weighting function that improves the remaining-capacity variation suppression capability of the storage battery.

Specifically, it is possible that the computation unit is configured to calculate the output command value by calculating a first multiplication result by multiplying a first coefficient matrix stored in the matrix storage unit and a vector representing the internal state at time n; calculating a second multiplication result by multiplying a second coefficient matrix stored in the matrix storage unit and a vector whose elements are (1) and (2) acquired by the control apparatus at the time n, (1) being the difference between the control target value and the output value of the storage battery, and (2) being the integrated value of the output value of the storage battery; adding up the first multiplication result and the second multiplication result so as to calculate a vector representing the internal state at time n+1; and multiplying the vector representing the internal state at the time n+1 by a third coefficient matrix stored in the matrix storage unit.

With this configuration, the computation unit can specifically calculate, from the internal state at a point in time, an output command value at a subsequent point in time, based on a coefficient matrix stored in the matrix storage unit of the control apparatus. By causing the inverter to charge or discharge the storage battery according to the output command value, all of the three properties of remaining-capacity variation suppression capability, target value followability, and robustness can be appropriately balanced.

A power control apparatus according to one aspect of the present invention includes: the aforementioned control apparatus; an inverter that causes the storage battery to charge or discharge such that the output value of the storage battery matches power corresponding to the output command value that is output from the control apparatus; and an integrator that integrates the output value of the storage battery, wherein upon receiving input of the difference between the control target value and the output value of the storage battery, and the integrated value obtained through integration of the output value of the storage battery by the integrator, the control apparatus outputs the output command value to the inverter.

With this configuration, the power control apparatus can control charge or discharge of the inverter according to the H-infinity control including the weighting functions that improve the remaining-capacity variation suppression capability of the storage battery. Accordingly, it is possible to appropriate balance all of the three properties of remaining-capacity variation suppression capability, target value followability, and robustness.

These general and specific aspects may be implemented using a system, a method, an integrated circuit, a computer program, or a recording medium, or any combination of systems, methods, integrated circuits, computer programs, or computer-readable recording media.

Hereinafter, embodiments of the present invention will be described with reference to the drawings. Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the claims. Therefore, among the structural elements in the following embodiments, structural elements not recited in any one of the independent claims are described as arbitrary structural elements.

An example of a configuration of a power storage apparatus according to an embodiment of the present invention will be described first with reference to FIG. 1.

Figure 1:
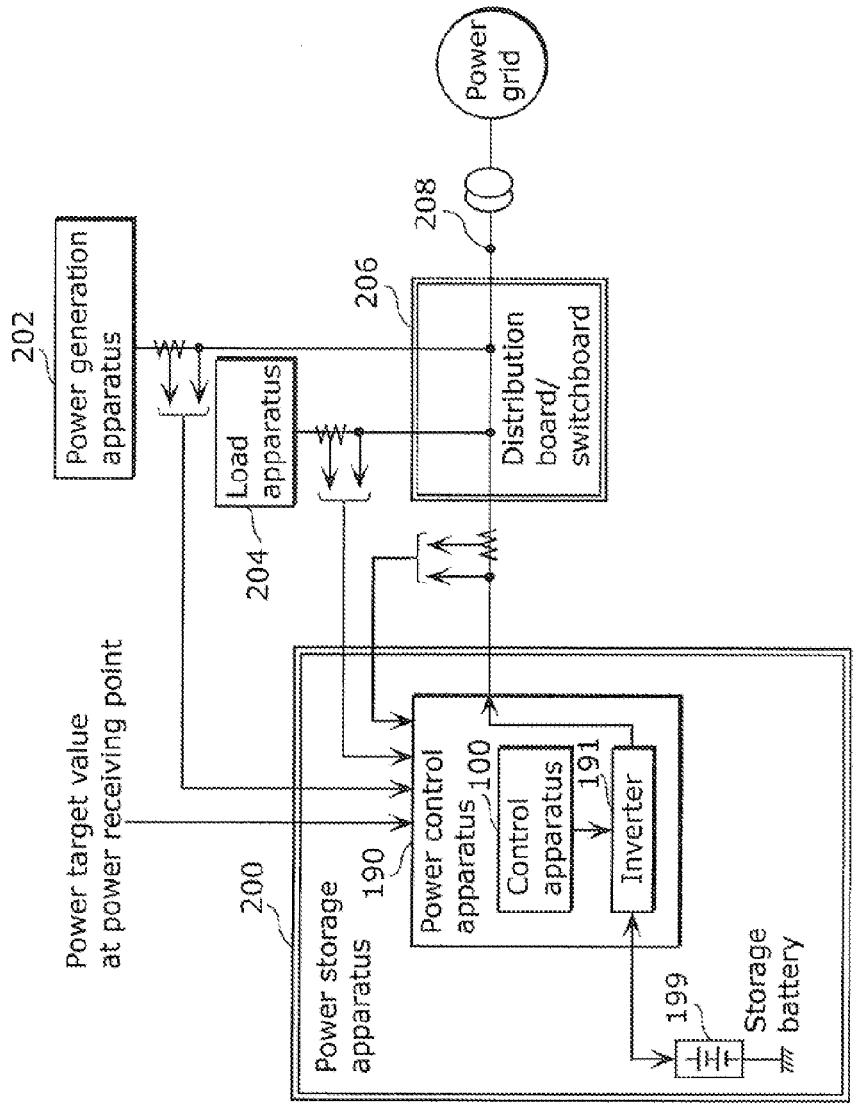
FIG. 1 is a diagram showing a system configuration of a power storage apparatus according to an embodiment of the present invention.

FIG. 1 is a diagram showing a system configuration of a power storage apparatus according to an embodiment of the present invention. As shown in FIG. 1, a power storage apparatus 200 according to an embodiment of the present invention acquires a power target value at the power receiving point, power generated by a power generation apparatus 202 and power consumed by a load apparatus 204, and outputs power to a distribution board/switchboard 206.

As used herein, the power target value at the power receiving point refers to a target value at which the power (so-called reverse power flow) flowing from the consumer side toward the power system side and the power flowing from the power system side toward the consumer side need to be balanced at a power receiving point 208. The power target value at the power receiving point has been set in advance between the consumer and the power supplier. Also, the power generation apparatus 202 can be, for example, a power generation apparatus such as a solar power generation apparatus, a wind power generation apparatus or a fuel cell cogeneration system. Also, the load apparatus 204 can be any apparatus that consumes power such as a television, an air conditioner or a charging apparatus for an electric vehicle.

The power storage apparatus 200 includes a power control apparatus 190 and a storage battery 199.

The power control apparatus 190 includes a control apparatus 100 and an inverter 191.

The storage battery 199 can be, for example, any type of storage battery such as a lithium ion battery, a lead storage battery, a sodium-sulfur battery or a nickel-cadmium battery.

Hereinafter, the power storage apparatus 200 will be described in further detail.

In FIG. 1, the power storage apparatus 200 includes the storage battery 199 and the power control apparatus 190 for controlling power that is produced by conversion of the direct current of the storage battery 199 to an alternating current and then output by the power storage apparatus 200 to a desired value. Also, the power storage apparatus 200 is, together with the load apparatus 204 and the power generation apparatus 202, connected to the distribution board/switchboard 206 that is a stand-alone distribution board or switchboard. In other words, the power storage apparatus 200 collects the charged or discharged power of the power storage apparatus 200, the generated power of the power generation apparatus 202 and the power consumption of the load apparatus 204.

In the power storage apparatus 200, the power target value at the power receiving point is set from outside the power storage apparatus 200, for example, by a user operation. The power receiving point denotes the boundary between the power supplier and the consumer, and refers to the point where the distribution board or switchboard is connected to a power grid. The power target value at the power receiving point is a value that needs to be satisfied by the power at the power receiving point 208. For example, when the power target value at the power receiving point is 0, the flow of power at the power receiving point 208 is 0. When the power target value at the power receiving point is positive, it means that the consumer is purchasing power from the power supplier. On the other hand, when the power target value at the power receiving point is negative, it means that the consumer is selling power to the power supplier.

The power storage apparatus 200 calculates and controls the power to be charged or discharged by the power storage apparatus 200 such that the actual power at the power receiving point takes the same value as the power target value at the power receiving point. Specifically, the power storage apparatus 200 calculates the power at the power receiving point by collecting the power values respectively from the power generation apparatus 202, the load apparatus 204 and the power storage apparatus 200, and summing the collected power values. The power control apparatus 190 performs feedback control such that the calculated value takes the same value as the power target value at the power receiving point by adjusting the power charged or discharged by the storage battery 199 by using the inverter 191.

The configuration of the storage battery 199 is not limited as long as it is a secondary battery such as a lithium ion battery, a lead storage battery or a redox flow battery. The configuration of the power generation apparatus 202 is not limited as long as it is a device capable of power generation such as a solar cell, a cogeneration system, a fuel cell, or a gas turbine. The configuration of the load apparatus 204 is not limited as long as it is a device that consumes power such as a household appliance or a motor device.

It is also possible to use, instead of the means for collecting the power consumption of the load apparatus 204, a means that directly collects the power at the power receiving point by installing, for example, a wattmeter at the power receiving point. The above description was given based mainly on the assumption of effective power, and the following description will also be given focusing on only effective power, but both effective power and reactive power can be used as control targets.

Figure 2:
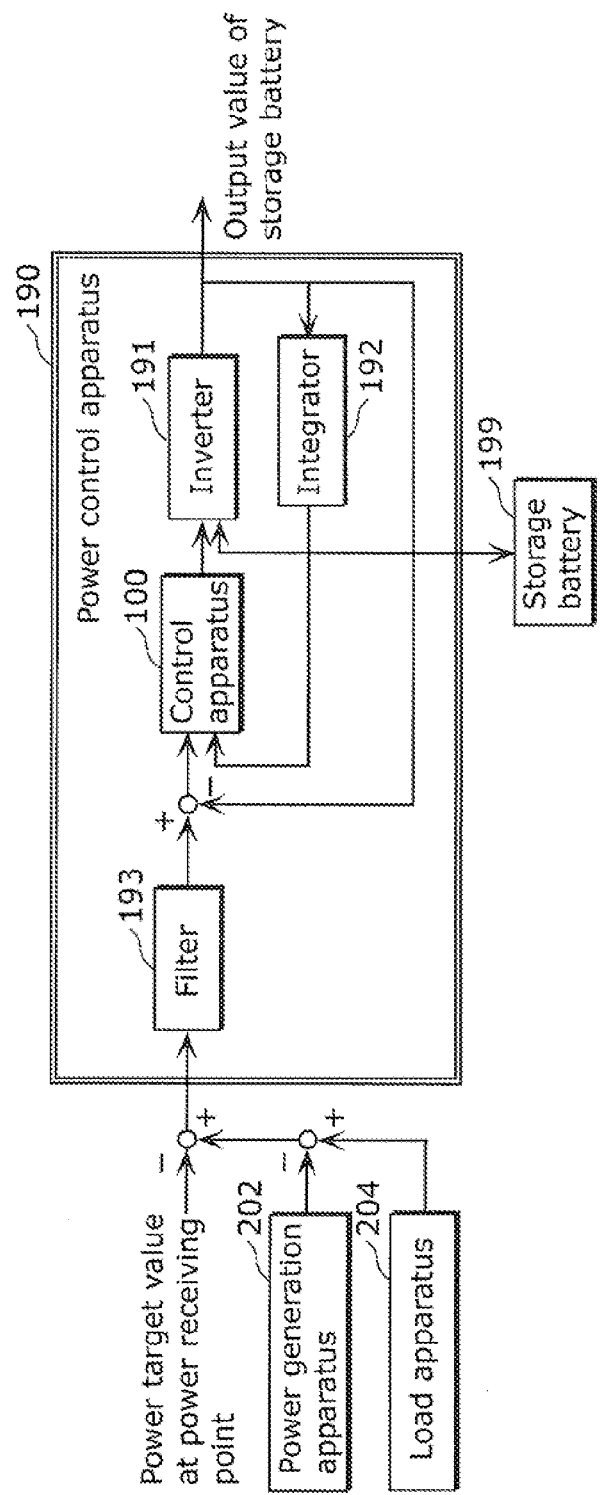
FIG. 2 is a diagram showing functional blocks of a power control apparatus according to an embodiment of the present invention.

Next, a configuration of the power control apparatus 190 of the power storage apparatus is shown in FIG. 2.

FIG. 2 is a diagram showing functional blocks of the power control apparatus 190. As shown in FIG. 2, the power control apparatus 190 includes the control apparatus 100, the inverter 191 connected to the storage battery 199, an integrator 192, and a filter 193.

The inverter 191 causes the storage battery 199 to charge or discharge such that an output value of the storage battery 199 matches the output command value that is output from the control apparatus 100. As used herein, the output value of the storage battery 199 is the power output by the storage battery 199, and can take a positive or a negative value. Specifically, when the output value is positive, the storage battery 199 is discharged. On the other hand, when the output value is negative, the storage battery 199 is charged. The output command value is a command value that is output to the inverter 191 that controls charge and discharge operations of the storage battery 199, in order to actually charge or discharge the storage battery 199 to a level corresponding to the output value indicating the charged or discharged power of the storage battery 199 determined by the control apparatus 100.

The integrator 192 time-integrates the output value to which the storage battery 199 was charged or discharged by the inverter 191.

Upon receiving input of the difference between the control target value and the output value of the storage battery 199, and the integrated output value obtained as a result of the integration by the integrator 192, the control apparatus 100 outputs the output command value to the inverter 191. In other words, the control apparatus 100 has a feedback loop for acquiring the output of the inverter 191.

The following provides a detailed description thereof.

The control apparatus 100 has two input signals and one output signal. One of the input signals of the control apparatus 100 is obtained by Equation (1) given below.

(Power consumption value of load apparatus 204−
output value of power generation apparatus 202−
power target value at power receiving point)×
transfer function of filter 193−output value of
power storage apparatus 200    Equation (1)

When the value of the input signal obtained by Equation (1) is positive, the control apparatus 100 adjusts the output of the inverter 191 in the positive direction. Conversely, when the value of the input signal obtained by Equation (1) is negative, the control apparatus 100 adjusts the output of the inverter 191 in the negative direction. The inverter 191 is a device for controlling the charge or discharge of the storage battery 199 to a desired value, and is connected to the storage battery 199.

With the above feedback loop, the output value of the power storage apparatus is controlled so as to be approximated to a value calculated by Equation (2) given below.

(Power consumption value of load apparatus 204−
output value of power generation apparatus 202−
power target value at power receiving point)×
transfer function of filter 193    Equation (2)

The filter 193 refers to signal processing for extracting specific frequency components of the input signal. The characteristics of the filter 193 are represented by a transfer function. For example, with a high-pass filter (HPF), only high frequency components of the input signal can be output by using a transfer function that suppresses low frequency components. In the above case, by using a high-pass filter, through calculation of the transfer function, the output value of the filter 193 takes a larger value as a value calculated by Equation (3) given below changes more abruptly, and takes a smaller value as the calculated value changes more slowly.

(Power consumption value of load apparatus−output
value of power generation apparatus−power target value at power receiving point)    Equation (3)

In other words, by using a high-pass filter, the power storage apparatus 200 can perform noise removal that cancels out abrupt changes of the power.

Conversely, when a low-pass filter (LPF) is used, the output value of the filter 193 takes a smaller value as the value calculated by Equation (3) given above changes more abruptly and takes a larger value as the calculated value changes more slowly. By using a low-pass filter, the power storage apparatus 200 can achieve the power balance between demand and supply in the entire system.

As the filter 193, it is also possible to use a band-pass filter (BPF) in which the properties of a high-pass filter and the properties of a low-pass filter are combined, or an all-pass filter (APF) in which the amplitude characteristics are constant.

The power control apparatus 190 does not necessarily have to include the filter 193. However, by providing an appropriate filter 193 for frequency bands mostly contained in the power to be controlled by the power control apparatus 190, the power control apparatus 190 can perform power control with higher accuracy.

The second input signal of the control apparatus 100 is obtained as a result of integration by the integrator 192 of the output value of the storage battery 199 that is output via the inverter 191. Integration of the charged or discharged power corresponds to calculation of the total amount of the charged or discharged power. In other words, the integrated output value of the storage battery 199 denotes the amount of change in the capacity of the storage battery 199.

The control apparatus 100 can reduce the change in the capacity of the storage battery by controlling the charged or discharged power in the direction that brings the amount of change in the capacity of the storage battery 199 closer to 0.

Next, a configuration of the control apparatus 100 will be described in detail with reference to FIG. 3.

Figure 3:
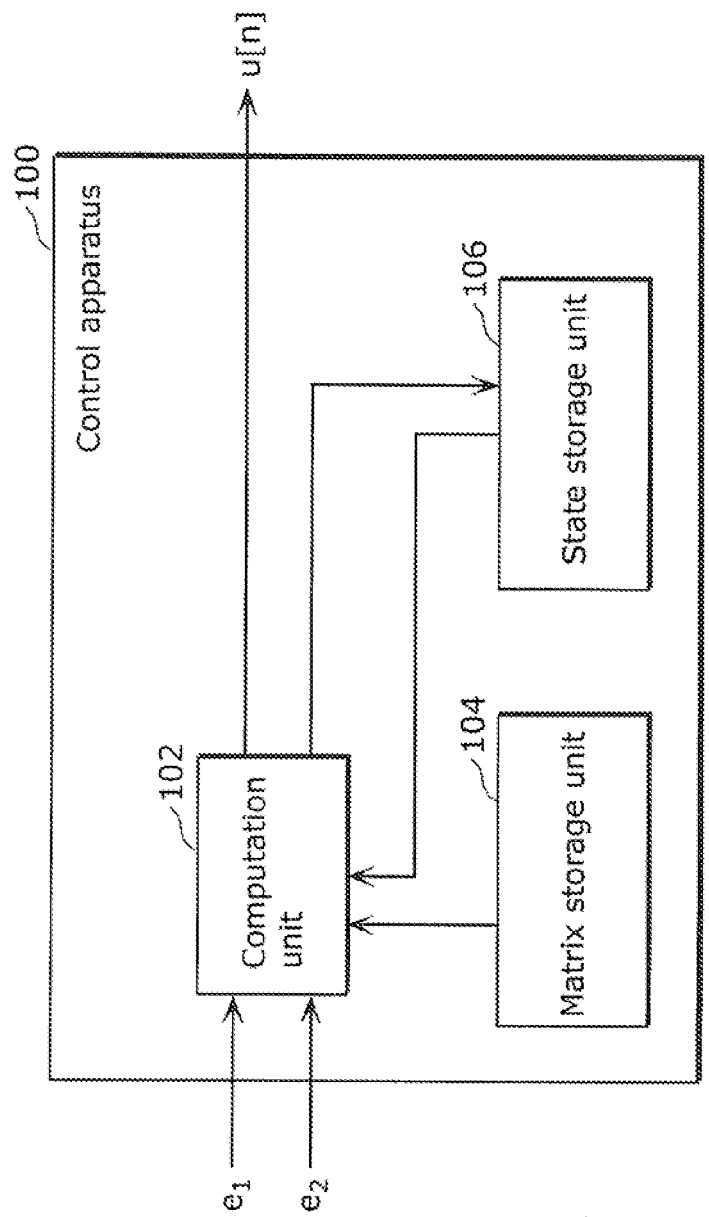
FIG. 3 is a diagram showing functional blocks of a control apparatus according to an embodiment of the present invention.

As shown in FIG. 3, the control apparatus 100 includes a computation unit 102, a matrix storage unit 104 and a state storage unit 106.

The matrix storage unit 104 stores coefficient matrices for representing transfer functions determined by the method for designing a control apparatus according to the present invention as state space equations. Specifically, the matrix storage unit 104 can be a RAM (Random Access Memory), a ROM (Read Only Memory), an SRAM (Static Random Access Memory) or the like. The method for determining a coefficient matrix will be described later.

The state storage unit 106 is a storage unit for storing a vector that represents an internal state of the state space equations. Specifically, the state storage unit 106 can be, as with the matrix storage unit 104, a RAM, a ROM, an SRAM or the like. A specific example of the internal state will be described later.

The computation unit 102 calculates an output command value u based on $e_1$, $e_2$, the internal state stored in the state storage unit 106 and the coefficient matrices stored in the matrix storage unit 104, which have been input into the control apparatus 100, where $e_1$ is a difference between the control target value and the output value of the storage battery 199, and $e_2$ is an integrated value of the output value of the storage battery 199.

To be more specific, the computation unit 102 multiplies a first coefficient matrix $A_k$ stored in the matrix storage unit 104 and a vector representing the internal state at time n. Next, a second coefficient matrix $B_k$ stored in the matrix storage unit 104 and a vector whose elements are $e_1$ and $e_2$ acquired by the control apparatus 100 at time n are multiplied. Next, the obtained two multiplication results are added up so as to calculate a vector representing the internal state at a point in time (or in other words, time n+1) subsequent to time n. Next, the computation unit 102 calculates an output u[n+1] at time n+1 by multiplying a third coefficient matrix $C_k$ stored in the matrix storage unit 104 and a vector representing the internal state at time n+1. The method for calculating each coefficient matrix will be described later.

Figure 4:
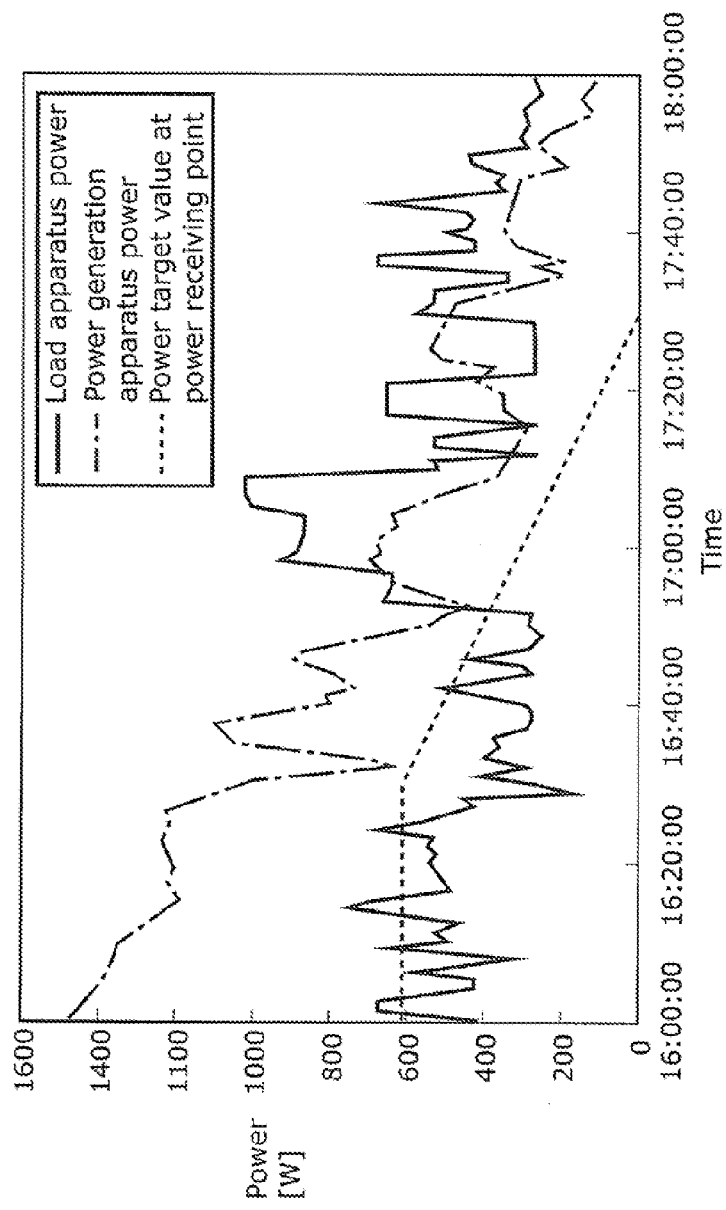
FIG. 4 is a diagram showing an example of changes in load power, generation apparatus power, and a power target value at the power receiving point.

Next, an example of changes in load apparatus power that is power consumed by the load apparatus 204, generation apparatus power that is power generated by the power generation apparatus 202, and the power target value at the power receiving point is shown in FIG. 4.

The load apparatus power changes with time according to the variation of demand of the consumer. Also, the generation apparatus power changes with time according to the variation of the output from a solar cell, a cogeneration system, a fuel cell, a gas turbine or the like.

The power target value at the power receiving point is constituted by a fixed value for every 30 minutes or a monotonic change. Here, the power target value at the power receiving point refers to, as described above, a value that needs to be satisfied by the power at the power receiving point 208. To be more specific, the power target value at the power receiving point is a power value that the consumer having an energy management system uses to inform the power supplier, in advance, how much power the consumer will purchase or sell in a 30-minute slot after 24 hours.

In order to achieve the power balance between demand and supply, it is necessary to reduce an error between the power target value at the power receiving point and the actual power at the power receiving point as much as possible. The power demand-supply balance property is represented by the 30-minute balancing value as described above. When the balancing value exceeds, for example, ±3%, a penalty is imposed that charges a unit price higher than usual for the auxiliary power purchased from the power company. Accordingly, in order to satisfy a 30-minute balancing value of ±3% as much as possible, the power storage apparatus 200 needs to control charged or discharged power. To this end, it is preferable that the control apparatus 100 has a high level of target value followability. Also, it is preferable that the control apparatus 100 has a high level of robustness. Furthermore, as described above, in order to suppress deterioration of the storage battery 199, it is preferable that the control apparatus 100 has a high level of remaining-capacity variation suppression capability.

A method for designing the control apparatus 100 that can balance the target value followability, the remaining-capacity variation suppression capability and the robustness at higher levels than conventional technology will be described below. To be more specific, an H-infinity controller is used as the model of the controller of the control apparatus 100. H-infinity controllers correspond to the related art of the present invention that can achieve both the target value followability and the robustness. An H-infinity controller obtained by adding to such an H-infinity controller design a new weighting function and controlled variable for improving the remaining-capacity variation suppression capability is used as the control apparatus 100 of the present embodiment. In the following description, the method for determining various parameters required to implement the H-infinity controller will be described as the method for designing the control apparatus 100.

Figure 5:
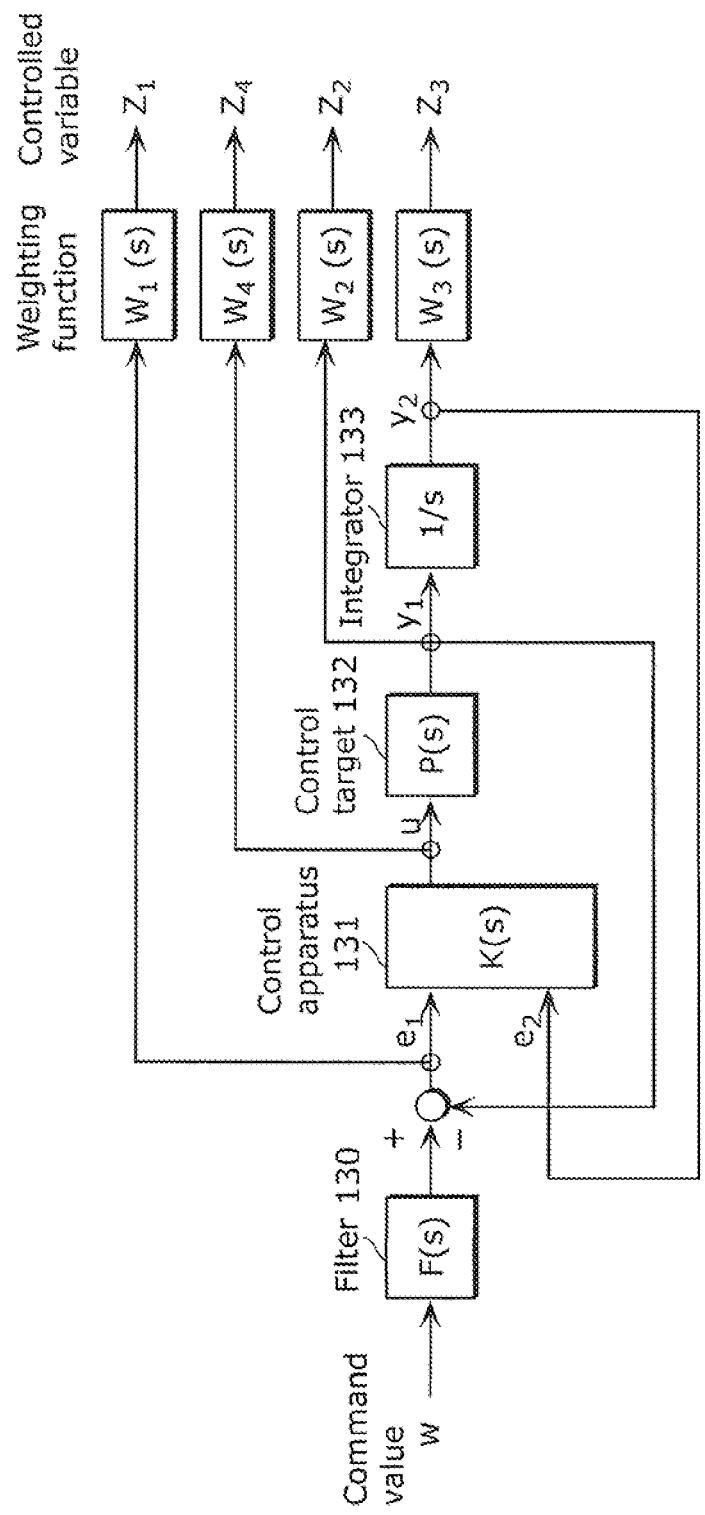
FIG. 5 is a block diagram showing an example of a configuration of a model of a power storage apparatus used when the control apparatus is designed as an H-infinity controller by using a design method according to an embodiment of the present invention.

FIG. 5 is a block diagram showing an example of a configuration of a model of a power storage apparatus used when designing the control apparatus 100 that has been modeled as an H-infinity controller by using the design method according to an embodiment of the present invention. The control apparatus 100 can be designed by determining parameters of a filter 130, a control apparatus 131, a control target 132, an integrator 133 and respective models of weighting functions shown in FIG. 5 as appropriate. The following provides a detailed description thereof.

K(s) is a transfer function of the H-infinity controller that is the control apparatus 131, and specifically corresponds to the control apparatus 100 of the power control apparatus 190 shown in FIG. 2.

P(s) is a transfer function of the control target 132, and specifically corresponds to the inverter 191 of the power control apparatus 190 shown in FIG. 2.

A command value w is a control target value. Specifically, it is the value calculated by Equation (3) given above. To be more specific, the command value w corresponds to a value obtained by Power consumption value of load apparatus 204−output value of power generation apparatus 202−power target value at power receiving point, shown in FIG. 2.

$y_1$ is an output of the control target 132, and specifically corresponds to the output value of the storage battery shown in FIG. 2.

F(s) is a transfer function of the filter 130. Specifically, by having, for example, a high-pass characteristic transfer function, only a high frequency component of the command value is input as the target value of the H-infinity controller.

The integrator 133 is an integrator that time-integrates the output $y_1$ of the control target.

$y_2$ is an output of the integrator 133.

There are two inputs $e_1$, and $e_2$ to the control apparatus 131 modeled as the H-infinity controller. As $e_1$, a difference value between the output of the filter 130 and the output $y_1$ of the control target 132 is input to the control apparatus 131, whereby a feedback structure for input of the target value is implemented. The output $y_2$ of the integrator 133 is input, as input $e_2$, directly to the control apparatus 131 serving as the H-infinity controller.

The values obtained by respectively multiplying the input $e_1$ to the H-infinity controller, the output $y_1$ of the control target, the output $y_2$ obtained as a result of time-integration, and the input u to the control target by weighting functions $W_1$, $W_2$, $W_3$ and $W_4$ are respectively defined as controlled variables $Z_1$, $Z_2$, $Z_3$ and $Z_4$.

The weighting functions $W_1$, $W_2$, $W_3$ and $W_4$ are represented as transfer functions. The characteristics of the control apparatus 131 can be changed by increasing or decreasing gains included in the respective transfer functions in the frequency domain. Note that the letter "s" included in the transfer functions represents a variable of the Laplace transform. The controlled variables $Z_1$, $Z_2$, $Z_3$ and $Z_4$ and the weighting functions $W_1$, $W_2$, $W_3$ and $W_4$ will be described later in detail.

Next, a method for designing the H-infinity controller will be described with reference to FIGS. 6 and 7.

Figure 6:
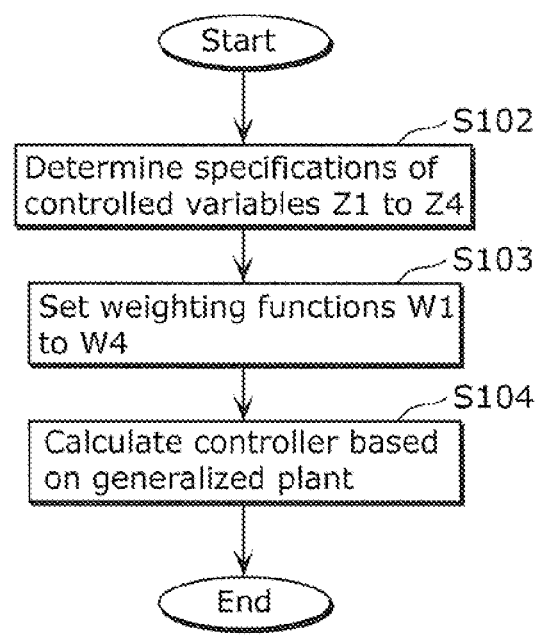
FIG. 6 is a flowchart illustrating a sequence of operations of a method for designing a control apparatus according to an embodiment of the present invention.

FIG. 6 is a flowchart illustrating a sequence of operations of a method for designing a control apparatus according to an embodiment of the present invention.

As described above, the control apparatus 100 is modeled as an H-infinity controller. Here, the H-infinity control theory is a control theory for constructing a control system that suppresses the influence of a disturbance signal or modeling error. Specifically, a transfer function is evaluated by a norm called "H-infinity norm", and is determined so as to be smaller than a desired value, whereby an intended property is achieved. To be more specific, by using a general control model called a "generalized plant" as a target, a design procedure is used in which the H-infinity norm of the transfer function is reduced from when a disturbance signal is input to when the evaluation is output. With this control system, an uncertain portion of the control target is handled as a disturbance signal, whereby the influence of uncertainty of the model is suppressed.

Here, the property of being effective and not losing stability in spite of an error from the assumed nominal model is referred to as "robustness". Designing a control system requires a model of a control target. However, it is often difficult to obtain a rigorous model of a control target, and thus an error between the obtained model and the actual control target is unavoidable. Robust control is a method for designing a robust control system that maintains stability in spite of such an error, and the H-infinity control is advantageous in that the need for a rigorous model is eliminated by the robustness.

In the H-infinity controller design described above, first, based on the control model shown in FIG. 5, specifications of the controlled variables $Z_1$, $Z_2$, $Z_3$ and $Z_4$ are determined (S102). The specifications of the controlled variables $Z_1$, $Z_2$, $Z_3$ and $Z_4$ refer to, for example, threshold values corresponding to the respective upper bounds of the controlled variables $Z_1$, $Z_2$, $Z_3$ and $Z_4$. It may be possible to determine threshold values corresponding to the upper and lower limits as the specifications.

Generally, the controlled variables $Z_1$, $Z_2$, $Z_3$ and $Z_4$ are preferably closer to 0. However, when actually determining the gain of the H-infinity controller, it is difficult to completely reduce all of the controlled variables to 0. Accordingly, it is necessary to set the threshold value of a controlled variable that is selectively reduced so as to be smaller according to the specifications required by the control apparatus 100 determined from the characteristics of the power storage apparatus 200 that is the target system. For example, when assumed noise contains a large number of high frequency components, the threshold value of the corresponding controlled variable Z may be selectively reduced in the high frequency band. Conversely, when assumed noise contains a large number of low frequency components, the threshold value of the corresponding controlled variable Z may be selectively reduced in the low frequency band.

Next, respective values of the weighting functions $W_1$, $W_2$, $W_3$ and $W_4$ are set based on the determined specifications (S103). For example, if it is assumed that Z is selectively reduced in the high frequency band, the value of W is set as a transfer function having high-pass characteristics that is large in the high frequency band, as expressed by Equation (4).

[Math. 1]

$$\frac{a \cdot Tw \cdot s}{Tw \cdot s + 1} \quad \text{Equation (4)}$$

In Equation (4), a and Tw are constants for determining high-pass characteristics.

To be more specific, the influence of each weighting function on the characteristics of the control apparatus 131 is as follows.

The weighting function $W_1$ has the effect of suppressing a following error. Accordingly, by setting the weighting function $W_1$ as appropriate, the target value followability of the control apparatus 100 can be improved. For example, in the case where $W_1$ is defined as 1/(0.1 s+1), an integration element is included in the transfer function, and thus the target followability particularly in the low frequency domain can be adjusted. Also, it is also possible to design $W_1$, by adding a term in which the numerator includes s as a differentiation element, so as to adjust the target followability in the high frequency domain. In other words, $W_1$ is determined according to the specifications of the target value followability required by the target system.

The weighting function $W_2$ has the effect of suppressing the influence of the modeling error. Accordingly, by setting the weighting function $W_2$ as appropriate, the robustness of the control apparatus 100 can be improved. For example, $W_2$ can be defined as 0.0001 s/(0.1 s+1). Specifically, as with $W_1$, $W_2$ is determined according to the specifications of the robustness required by the target system.

The weighting function $W_3$ has the effect of suppressing the variation in the remaining capacity of the storage battery. Accordingly, by setting the weighting function $W_3$ as appropriate, the remaining-capacity variation suppression capability of the control apparatus 100 can be improved. For example, $W_3$ can be defined as 0.001. In this case, $W_3$ is set as a constant in order to improve the remaining-capacity variation suppression capability of the control apparatus 100 in the entire frequency domain. $W_3$ is preferably set to be, for example, greater than 0.0001, which is the coefficient of the numerator of $W_2$, and less than 0.02, which is the coefficient of the numerator of $W_4$.

The weighting function $W_4$ has the effect of suppressing the output of the controller and preventing saturation. Accordingly, by setting the weighting function $W_4$ as appropriate, the robustness of the control apparatus 100 can be improved. For example, $W_4$ can be defined as 0.02 s/(0.1 s+1).

Lastly, the transfer function K(s) of the control apparatus 131 is calculated based on the generalized plant by applying a solution for an H-infinity control problem (S104).

For example, a control apparatus 100 of a near-optimal solution can be designed by determining K(s) such that the H-infinity norm of a generalized plant Tzw in the case where the model shown in FIG. 5 is transformed to the form of a standard H-infinity control problem including the transfer function K(s) of the controller and the generalized plant Tzw satisfies ||Tzw||∞<0.005. As used herein, ||Tzw||∞ is defined as a largest singular value in the entire frequency domain of the function Tzw, as expressed by Equation (5).

[Math. 2]

$$\|Tzw\|_\infty = \sup_\omega \sigma(Tzw(j\omega)) \quad \text{Equation (5)}$$

In Equation (5), σ(•) indicates the largest singular value.

A further detailed solution for the H-infinity control problem is not given here because NPL 1 provides a detailed description thereof.

In the method for designing a control apparatus according to the present invention, the weighting function $W_4$ and the controlled variable $Z_4$ shown in FIG. 5 do not necessarily have to be determined. This is because, the robustness against the modeling error out of the robustness achieved by the control apparatus 100 is achieved by determining the weighting function $W_2$ and the controlled variable $Z_2$. However, by determining the weighting function $W_4$ and the controlled variable $Z_4$, the control apparatus 100 can suppress the output of the controller and prevent saturation. As a result, more robust control can be performed.

Figures 7, 8:
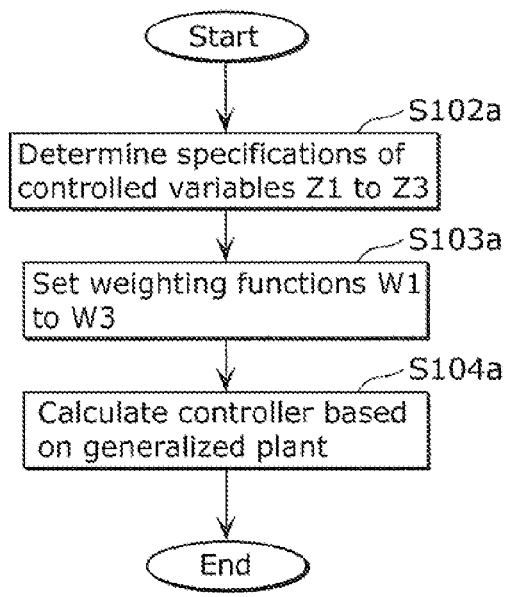
FIG. 7 is a flowchart illustrating a sequence of operations of a method for designing a control apparatus according to an embodiment of the present invention.
FIG. 8 shows an example of parameters used in the model of the power storage apparatus according to an embodiment of the present invention.

FIG. 7 is a flowchart illustrating a processing procedure of the method for designing a control apparatus in the case where the controlled variable $Z_4$ and the weighting function $W_4$ are not used.

The processing of each of the steps S102a, S103a and S104a shown in FIG. 7 is the same as that shown in FIG. 6, except that processing of the controlled variable $Z_4$ and the weighting function $W_4$ is not included.

Referring to FIG. 7, as described above, the method for designing a control apparatus of the present embodiment is a method for designing a control apparatus that outputs an output command value for instructing charging or discharging to an inverter that controls an output value indicating the power to be charged or discharged by a storage battery. Specifically, the method includes: determining a first threshold value used in judging a first controlled variable, a second threshold value used in judging a second controlled variable, and a third threshold value used in judging a third controlled variable (S102a); setting a first weighting function for calculating the first controlled variable by multiplying a difference between a control target value and an output value, a second weighting function for calculating the second controlled variable by multiplying the output value and a third weighting function for calculating the third controlled variable by multiplying an integrated value of the output value (S103a); and determining a transfer function of a control apparatus that receives input of the difference between the control target value and the output value, and the integrated value of the output value and outputs an output command value (S104a).

Here, in the determining of a transfer function (S104a), the transfer function is determined in accordance with the H-infinity control theory such that the first controlled variable obtained by multiplying the difference between the control target value and the output value by the first weighting function is smaller than the first threshold value, the second controlled variable obtained by multiplying the output value by the second weighting function is smaller than the second threshold value, and the third controlled variable obtained by multiplying the integrated value of the output value by the third weighting function is smaller than the third threshold value.

Referring back to FIG. 6, a fourth threshold value may be further determined in the determining of a threshold value (S102), a fourth weighting function for calculating a fourth controlled variable by multiplying the output command value may be further set in the setting of weighting functions (S103), and the transfer function may be determined in accordance with the H-infinity control theory such that the fourth controlled variable is smaller than the fourth threshold value in the determining of a transfer function (S104).

FIG. 8 shows an example of parameters of the block diagram of the H-infinity control design shown in FIG. 5 that were determined by the above-described design method.

F(s) is a transfer function of the filter. Here, the power control apparatus 190 uses, as an example, a filter having a high-pass characteristic transfer function and a time constant of 5.05 seconds as a filter suitable for controlling fine variations of power. A filter having such characteristics is suitable in the case where, for example, the power generation apparatus 202 is a power generation apparatus whose output power varies significantly such as a solar power generation system. The time constant is a parameter for determining a cut-off frequency of a first-order frequency response in a linear time-invariant system, and physically indicates the time until the step response of the system reaches approximately 63.2% of the final value.

P(s) is a plant, representing the model of the control target by using a transfer function. Here, taking into consideration the output characteristics of the power control apparatus 190 of the power storage apparatus 200 serving as the control target, a model having a low-pass characteristic transfer function and a time constant of 0.1 seconds is used as an example. This model is a model having a rise time.

$W_1$, $W_2$, $W_3$ and $W_4$ are weighting functions, and as described above, respectively have roles that adjust respective properties. Specifically, for example, increasing $W_1$ results in improved target value followability. Increasing $W_2$ results in suppression of the storage battery output and improved robustness against the modeling error. Increasing $W_3$ results in improved remaining-capacity variation suppression capability. Increasing $W_4$ results in suppression of control input and improved robustness against the modeling error. The weighting functions are also represented by transfer functions, and thus can be adjusted in the frequency domain.

As described above, by setting the four weighting functions so as to satisfy the specifications according to the above-descried roles, predictability in design is improved. Accordingly, it becomes easy to simultaneously achieve three properties of the control apparatus 100, namely, the remaining-capacity variation suppression capability, the target value followability and the robustness in an appropriate balance.

In the example of FIG. 8, $W_1$ is represented as a low-pass characteristic transfer function having a value greater than the other weighting functions, in order to improve followability at high frequencies. $W_2$ is represented as a high-pass characteristic transfer function in order to improve robustness against the modeling error at low frequencies. $W_3$ is represented as a constant in order to adequately suppress variations in the remaining capacity of the storage battery over various frequencies. $W_4$ is represented as a high-pass characteristic transfer function in order to suppress control input at high frequencies.

As described above, after the weighting functions have been determined according to the characteristics of the system serving as the control target, the control apparatus 100 serving as the H-infinity controller described above is determined as a continuous time transfer function. The transfer function thus obtained is transformed to a discrete-time transfer function with a sampling period of Ts=0.01 [s] and then transformed to a state space representation, the result of which is a state space equation shown in FIG. 9.

Referring to FIG. 9, x[n] is an internal state represented by a five dimensional column vector in step n. Also, e[n] is a feedback input that is input to the H-infinity controller in step n, and specifically represented as follows,

[Math. 3]

$$\begin{bmatrix} e_1[n] \\ e_2[n] \end{bmatrix}$$

Also, u[n] is an output of the control apparatus in step n. To be more specific, $e_1$ is an input representing a deviation between the control target value and the output value of the storage battery 199. Also, $e_2$ is an input representing an integrated value of the output value of the storage battery 199. $A_k$, $B_k$ and $C_k$ are coefficient matrices in the state space equation. Specifically, $A_k$, $B_k$, $C_k$ are values calculated through calculation described in NPL 1 mentioned above, or the like.

Figure 10:
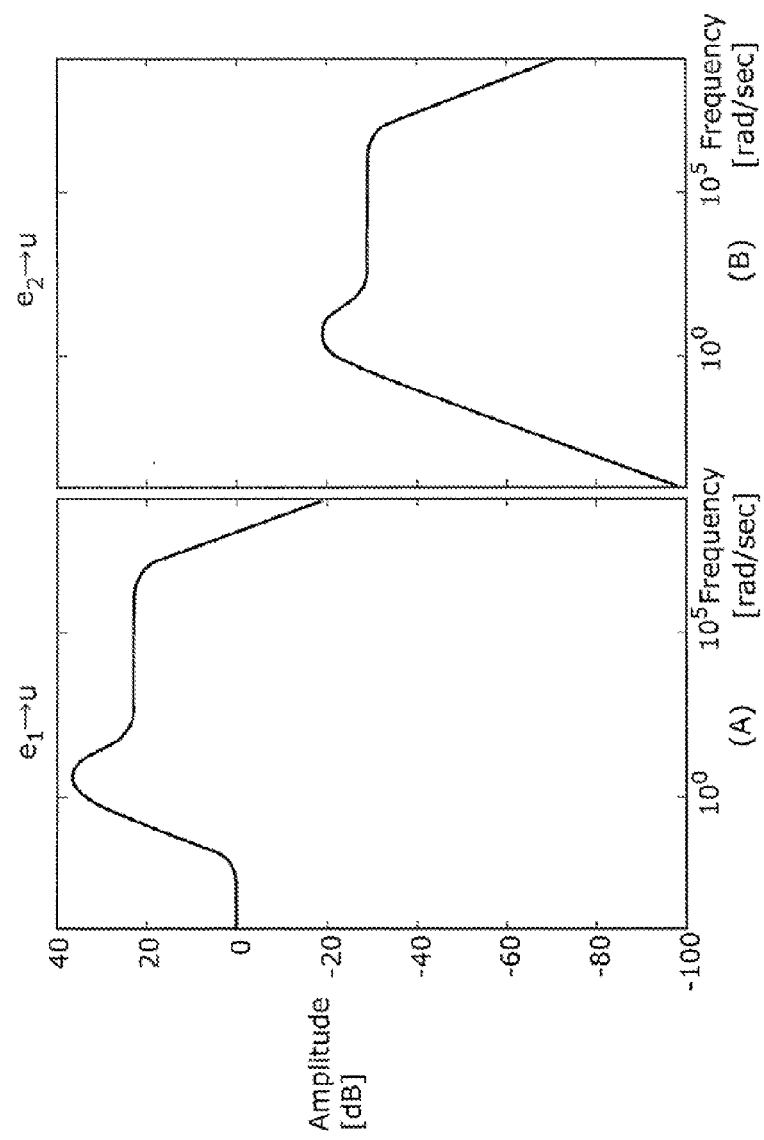
FIG. 10 shows Bode gain plots for an H-infinity controller designed by using the method for designing a control apparatus according to an embodiment of the present invention.

FIG. 10 shows Bode gain plots for the control apparatus 100 serving as the H-infinity controller designed by the method for designing a control apparatus of the present embodiment. In the Bode gain plots, the horizontal axis indicates frequency expressed in logarithm, and the vertical axis indicates the logarithmic magnitude [dB] of the amplitude ratio (gain) between input and output.

More specifically, FIG. 10(A) is a Bode gain plot showing the gain obtained between the input $e_1$ and the output u of the control apparatus 100. FIG. 10(B) is a Bode gain plot showing the gain obtained between the input $e_2$ and the output u of the control apparatus 100. Note that the vertical axes of FIGS. 10(A) and 10(B) share a common scale.

As shown in FIG. 10(A), the gain obtained between the input $e_1$ representing the deviation between the target value and the output value and the output u of the control apparatus 100 exhibited a high level in the range from 1 rad/sec to $10^6$ rad/sec. On the other hand, as shown in FIG. 10(B), the gain obtained between the input $e_2$ representing the integrated output value and the output u of the control apparatus 100 exhibited a relatively low level at all frequencies than the gain of the former shown in FIG. 10(A), from which it can be said that qualitatively, the output u is controlled by giving importance to the input $e_1$, rather than to the input $e_2$.

Figure 11:
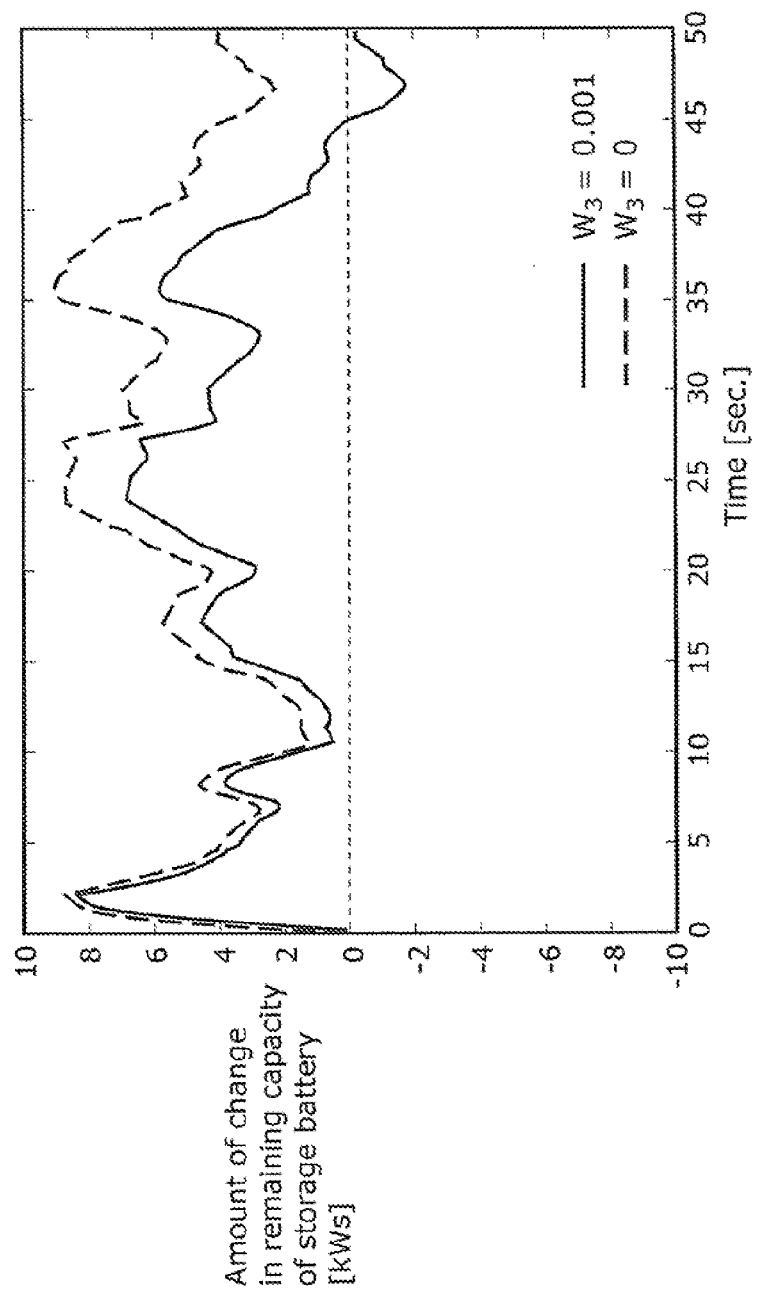
FIG. 11 is a diagram showing results (effects of W3) of simulation of control by a control apparatus designed by the design method according to an embodiment of the present invention.

Next, the results obtained by simulating the effect of the weighting function $W_3$ when the load apparatus power, the generation apparatus power and the power target value at the power receiving point shown in FIG. 4 are input, in the power control apparatus 190 (see the control configuration shown in FIG. 2) of the control apparatus 100 designed by the method for designing a control apparatus of the present embodiment are shown in FIG. 11.

FIG. 11 shows simulation results of the amount of change in the remaining capacity of the storage battery 199. In FIG. 11, the horizontal axis indicates time [sec.], and the vertical axis indicates the difference [kids] from the initial value of the storage capacity of the storage battery. The amount of change in the remaining capacity when the weighting function $W_3$ was 0 is indicated by a broken line, and the amount of change in the remaining capacity when the weighting function $W_3$ was 0.001 is indicated by a solid line.

A comparison between the solid line and the broken line illustrates that the difference from the initial value was smaller (or in other words, the amount of change in the remaining capacity was smaller) for the remaining capacity of the storage battery controlled by the H-infinity controller having the weighting function $W_3$. This is because as described above, the variation in the remaining capacity of the storage battery was reduced by increasing $W_3$. It is clearly seen from the above that the effect of suppressing deterioration of the storage battery is obtained by reducing an excessive change in the capacity.

However, as an adverse effect of the effect of suppressing deterioration of the storage battery by introducing the weighting function $W_3$, the target value followability may deteriorate. This is because, as described above, the remaining-capacity variation suppression capability and the target value followability are in a trade-off relationship. Accordingly, in order to evaluate the adverse effect of $W_3$, the amount of effective power purchased was simulated under the condition where the target value was initially set to 0 kW and after two seconds, set to 5 kW.

Figure 12:
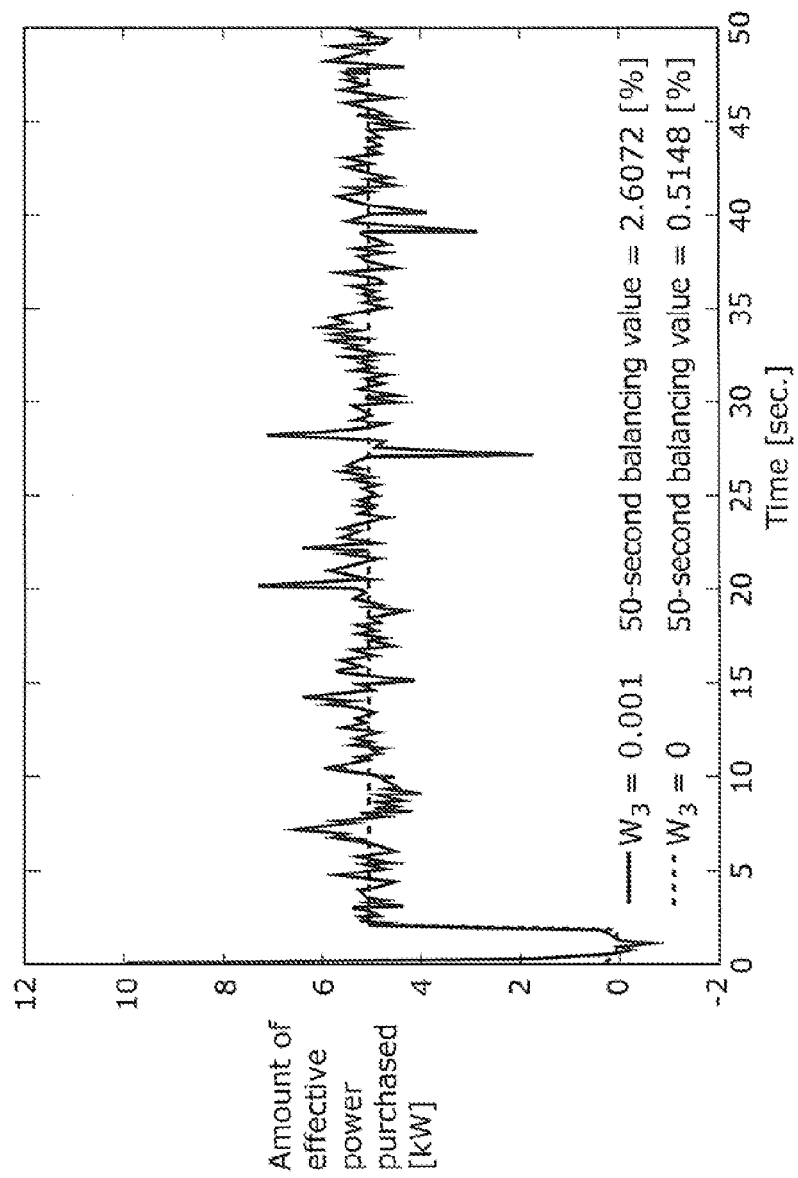
FIG. 12 is a diagram showing results (adverse effects of W3) of simulation of control by a control apparatus designed by the design method according to an embodiment of the present invention.

FIG. 12 shows the result of simulation of the amount of effective power purchased by the consumer from the power supplier, as a result of the control by the power control apparatus. In FIG. 12, the horizontal axis indicates time [sec.], and the vertical axis indicates the amount of effective power purchased [kW]. The amount of effective power purchased when the weighting function $W_3$ was 0 is indicated by a broken line, and the amount of effective power purchased when the weighting function $W_3$ was 0.001 is indicated by a solid line.

In the case of $W_3$=0, the control apparatus 100 performs output value optimization only on the deviation $e_1$ between the control target value and the output value, without giving consideration to the remaining capacity of the storage battery 199. As a result, the amount of effective power purchased was substantially constant. Accordingly, it can be seen that the control of the output value can follow the control target value. On the other hand, in the case of W3=0.001, the control apparatus 100 gives consideration to the remaining capacity of the storage battery 199. Accordingly, the amount of effective power purchased slightly fluctuated.

When the balancing value (the average of divergences from the target output value) for 50 seconds, which is shorter than 30 minutes, was calculated, in the case of $W_3$=0, 0.5149 [%] was obtained, and in the case of $W_3$=0.001, 2.6072 [%] was obtained. That is, the balancing value is higher in the case of $W_3$=0.001. Accordingly, it can be seen that the target value followability of the control apparatus 100 deteriorates as a result of the weighting function $W_3$ being introduced when designing the control apparatus 100. However, even in the case of $W_3$=0.001, the 50-second balancing value was 3% or less, from which it can be statistically predicted that the 30-minute balancing value will also be 3% or less.

From the above simulation result, it can be seen that in the method for designing a control apparatus of the present embodiment in which the weighting function $W_3$ is introduced, the target value followability decreases slightly, but stays within a range that does not cause a problem.

Also, the effect of the weighting function $W_4$ was checked by performing a simulation to check the robustness against the modeling error. The result of the simulation is shown in FIG. 13.

Figure 13:
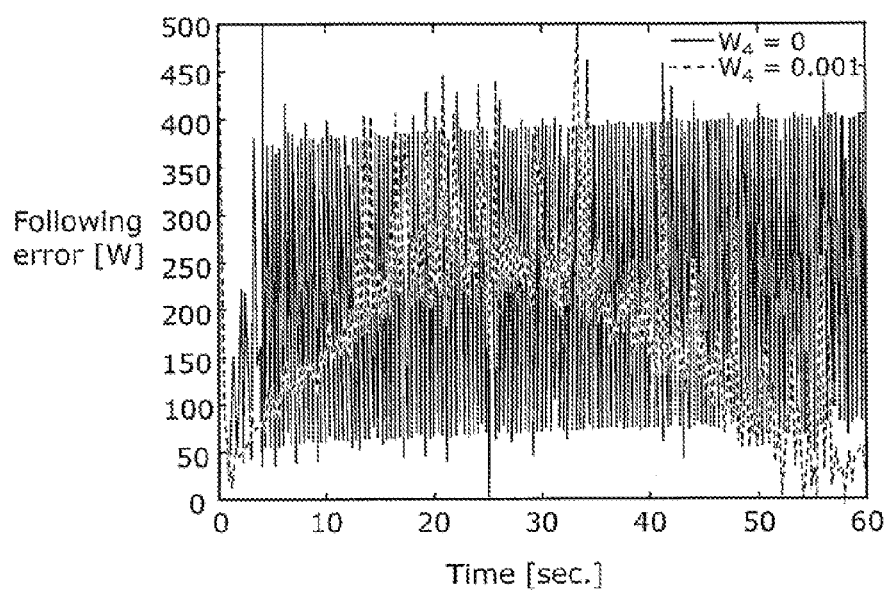
FIG. 13 is a diagram showing results (effects of W4) of simulation of control by a control apparatus designed by the design method according to an embodiment of the present invention.

FIG. 13 is a diagram obtained by plotting the result of simulation of the following error in the case where a variation was intentionally added to the plant model $P(s)=1/(T_b s+1)$. The horizontal axis indicates time [sec.] and the vertical axis indicates the following error [W].

In this simulation, a variation indicated by $(s-1)/(s+1)$ was added to the model $P(s)$. This variation is called an "all-pass function". As a result of addition of the variation, the gain of the modeling error was constant throughout the frequency domain, and only the phase changed. As a result, as shown in FIG. 13, the following error was much larger in the case of $W_4$=0 than in the case of $W_4$=0.001. Accordingly, it can be seen that the robustness is improved by using the weighting function $W_4$ in the method for designing the control apparatus 100.

The above simulation results illustrate that with the method for designing a control apparatus of the embodiment of the present invention, it is possible to design a control apparatus that simultaneously achieves three properties, namely, the remaining-capacity variation suppression capability, the target value followability, and the robustness in an appropriate balance.

There are other advantages of using the method for designing a control apparatus of the present embodiment. With a conventional control apparatus using PI controller, there is no choice but to determine the gain through a trial-and-error operation. However, by using an H-infinity controller, the relevancy between the properties of the control apparatus and the controlled variable becomes clear. Accordingly, it is possible to improve the predictability in design of control apparatus. With an improved predictability in design, the design of the control apparatus can be easily changed. For example, when a 30-minute balancing value of 3% needs to be changed to a rigorous condition such as, for example, to 0.3% or less, it is easily seen that it can be achieved by making adjustment such that $W_1$ is set to be smaller and $W_3$ is set to be larger.

The steps of the method for designing a control apparatus described in the embodiment of the present invention can be executed by a computer. The control apparatus and the like designed by the method for designing a control apparatus described in the embodiment of the present invention can also be executed by a computer.

A program for causing a computer to execute the steps of the method for designing a control apparatus, according to which the control apparatus 100 and the like designed by that design method performs processing is stored in a computer-readable medium and read by a computer. Specifically, this program is a program that causes a computer to execute a method for designing a control apparatus that outputs an output command value for instructing charging or discharging to an inverter that controls an output value indicating power to be charged or discharged by a storage battery in order for a storage amount of the storage battery to match a control target value, the method including: determining a first threshold value used in judging a first controlled variable, a second threshold value used in judging a second controlled variable, and a third threshold value used in judging a third controlled variable; setting a first weighting function for calculating the first controlled variable, a second weighting function for calculating the second controlled variable, and a third weighting function for calculating the third controlled variable; and determining a transfer function of the control apparatus that receives input of a difference between the control target value and the output value and an integrated value of the output value and outputs the output command value, wherein in the determining of a transfer function, the transfer function is determined in accordance with an H-infinity control theory such that the first controlled variable obtained by multiplying the difference between the control target value and the output value by the first weighting function is smaller than the first threshold value, the second controlled variable obtained by multiplying the output value by the second weighting function is smaller than the second threshold value, and the third controlled variable obtained by multiplying the integrated value of the output value by the third weighting function is smaller than the third threshold value.

The computer includes a CPU (Central Processing Unit), a ROM (Read Only Memory), a RAM (Random Access Memory), a hard disk and the like.

The CPU executes the read program. The ROM stores programs and data required by the computer to perform operations. The RAM stores data such as parameters for executing programs. The hard disk stores programs, data and the like.

Furthermore, some or all of the constituent elements constituting the control apparatus 100 and the like designed by the above method for designing a control apparatus may be configured with a single system LSI (Large Scale Integrated Circuit). The system LSI is a super-multifunctional LSI manufactured by integrating a plurality of constituent units on a single chip, and specifically is a computer system including a microprocessor, a ROM, a RAM and the like. The RAM stores a computer program. The system LSI accomplishes its function by the microprocessor performing operations in accordance with the computer program.

Furthermore, some or all of the constituent elements constituting the control apparatus 100 and the like designed by the above method for designing a control apparatus may be configured with an IC card removably attachable to an apparatus or a stand-alone module. Such an IC card or module is a computer system including a microprocessor, a ROM, a RAM and the like. The IC card or module may include a super-multifunctional LSI as described above. The IC card or module accomplishes its function by the microprocessor performing operations in accordance with the computer program. The IC card or module may have tamper resistance.

The present invention may be configured as a control apparatus including a RAM, a CPU, a ROM and the like and storing transfer functions determined by the above method for designing a control apparatus.

Furthermore, the present invention may be configured by recording the computer program or the digital signal in computer-readable recording media such as flexible disk, hard disk, CD-ROM, MO, DVD, DVD-ROM, DVD-RAM, BD (Blu-ray Disc®) and USB memory, memory cards such as SD card, semiconductor memories and the like. Also, the present invention may be configured as the digital signal recorded in such recording media.

The present invention may be configured to transmit the above-described computer program or digital signal via electric communication lines, wireless or wired communication lines, networks such as the Internet, data broadcasts and the like.

Also, the present invention may be a computer system including a microprocessor and a memory, wherein the memory stores the above-described computer program, and the microprocessor performs operations in accordance with that computer program.

By recording and transferring the program or the digital signal on recording media as described above, or by transferring the program or the digital signal via networks as described above, the present invention may be carried out by other independent computer systems.

The embodiment disclosed herein is considered in all respects as illustrative and not restrictive. The scope of the invention is indicated by the appended claims rather than by the foregoing description. All variations and modifications falling within the equivalency range of the appended claims are intended to be embraced therein.

INDUSTRIAL APPLICABILITY

The present invention is applicable to a method for designing a control apparatus, in particular to a method for designing a control apparatus that outputs an output command value to an inverter that controls power to be charged or discharged by a storage battery.

REFERENCE SIGNS LIST

32 Display
34 Computer
36 Keyboard
38 Mouse
40 CD-ROM device
42 CD-ROM
44 CPU
46 ROM
48 RAM 50 Hard disk
52 Communication modem
54 Bus
100, 131, 900 Control apparatus
102 Computation unit
104 Matrix storage unit
106 State storage unit
132 Control target
190 Power control apparatus
191 Inverter
133, 192 Integrator
130, 193 Filter
199 Storage battery
200 Power storage apparatus
202 Power generation apparatus
204 Load apparatus
206 Distribution board/switchboard
208 Power receiving point
901 Storage amount deviation estimation unit
902 Correction amount calculation unit
903 Storage battery output command unit

The invention claimed is:

1. A computer-implemented method for designing a control apparatus that outputs an output command value for instructing charging or discharging to an inverter that controls an output value indicating power to be charged or discharged by a storage battery in order for a storage amount of the storage battery to match a control target value, the method comprising:
determining a first threshold value used in judging a first controlled variable, a second threshold value used in judging a second controlled variable, and a third threshold value used in judging a third controlled variable;
setting a first weighting function for calculating the first controlled variable, a second weighting function for calculating the second controlled variable, and a third weighting function for calculating the third controlled variable; and
determining, using a processor, a transfer function of the control apparatus that receives input of a difference between the control target value and the output value and an integrated value of the output value and outputs the output command value,
wherein in the determining of a transfer function, the transfer function is determined in accordance with an H-infinity control theory such that the first controlled variable obtained by multiplying the difference between the control target value and the output value by the first weighting function is smaller than the first threshold value, the second controlled variable obtained by multiplying the output value by the second weighting function is smaller than the second threshold value, and the third controlled variable obtained by multiplying the integrated value of the output value by the third weighting function is smaller than the third threshold value.

2. The computer-implemented method for designing a control apparatus according to claim 1,
wherein in the determining of a threshold value, a fourth threshold value is further determined,
in the setting of weighting functions, a fourth weighting function for calculating a fourth controlled variable by being multiplied by the output command value is set, and
in the determining of a transfer function, the transfer function is further determined in accordance with the H-infinity control theory such that the fourth controlled variable is smaller than the fourth threshold value.

3. A control apparatus comprising:
a matrix storage unit configured to store a coefficient matrix for representing, as a state space, the transfer function determined by the computer-implemented method for designing a control apparatus according to claim 1;
a state storage unit configured to store a vector representing an internal state in the state space; and
a computation unit configured to calculate the output command value based on the difference between the control target value and the output value of the storage battery, the integrated value of the output value of the storage battery, the internal state stored in the state storage unit, and the coefficient matrix.

4. The control apparatus according to claim 3,
wherein the computation unit is configured to calculate the output command value by:
calculating a first multiplication result by multiplying a first coefficient matrix stored in the matrix storage unit and a vector representing the internal state at time n;
calculating a second multiplication result by multiplying a second coefficient matrix stored in the matrix storage unit and a vector whose elements are (1) and (2) acquired by the control apparatus at the time n, (1) being the difference between the control target value and the output value of the storage battery, and (2) being the integrated value of the output value of the storage battery;
adding up the first multiplication result and the second multiplication result so as to calculate a vector representing the internal state at time n+1; and
multiplying the vector representing the internal state at the time n+1 by a third coefficient matrix stored in the matrix storage unit.

5. A power control apparatus comprising:
the control apparatus according to claim 3;
an inverter that causes the storage battery to charge or discharge such that the output value of the storage battery matches power corresponding to the output command value that is output from the control apparatus; and
an integrator that integrates the output value of the storage battery,
wherein upon receiving input of the difference between the control target value and the output value of the storage battery, and the integrated value obtained through integration of the output value of the storage battery by the integrator, the control apparatus outputs the output command value to the inverter.

6. A non-transitory computer-readable recording medium on which a program is recorded, the program for causing a computer to execute the computer-implemented method for designing a control apparatus according to claim 1.

* * * * *